(12) United States Patent
Hatahori et al.

(10) Patent No.: US 12,099,000 B2
(45) Date of Patent: Sep. 24, 2024

(54) DEFECT DETECTION DEVICE AND DEFECT DETECTION METHOD

(71) Applicant: SHIMADZU CORPORATION, Kyoto (JP)

(72) Inventors: Takahide Hatahori, Kyoto (JP); Kenji Takubo, Kyoto (JP); Tomotaka Nagashima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 18/077,213

(22) Filed: Dec. 7, 2022

(65) Prior Publication Data

US 2023/0236111 A1 Jul. 27, 2023

(30) Foreign Application Priority Data

Jan. 25, 2022 (JP) .................................. 2022-009720

(51) Int. Cl.
*G01N 21/17* (2006.01)
*G01N 21/88* (2006.01)

(52) U.S. Cl.
CPC ......... *G01N 21/1702* (2013.01); *G01N 21/88* (2013.01); *G01N 2021/1706* (2013.01)

(58) Field of Classification Search
CPC ............... G01N 21/1702; G01N 21/88; G01N 21/8851; G01N 21/01; G01N 2021/1706; G01N 3/32; G01N 29/043; G01N 29/2418; G01N 29/08; G01N 2021/0112; G01N 2021/8887
See application file for complete search history.

(56) References Cited

U.S. PATENT DOCUMENTS

| 10,942,152 B2* | 3/2021 | Hatahori | G01N 29/069 |
| 2017/0350690 A1 | 12/2017 | Hatahori et al. | |
| 2021/0270777 A1* | 9/2021 | Hatahori | G01N 21/8806 |

FOREIGN PATENT DOCUMENTS

| JP | 2017219318 | 12/2017 |
| WO | 2021145034 | 7/2021 |

* cited by examiner

*Primary Examiner* — Suman K Nath
(74) *Attorney, Agent, or Firm* — JCIPRNET (57) ABSTRACT

In a defect detection device (10), an input receiver (161) receives an input, by a user, of information concerning the kind and size of a defect expected to be present in or on a test object. An exciter (11, 12) induces an elastic wave in the test object, with the frequency of the elastic wave being variable. A measurer (15) optically measures a vibration state of the surface of the test object caused by the elastic wave. A wavelength determiner (164) determines the wavelength of the elastic wave induced in the test object, based on the vibration state obtained by the measurer. A frequency selector (165) selects an appropriate frequency from a plurality of frequencies, based on the kind and size of the expected defect as well as the wavelength acquired for each of the plurality of frequencies by the wavelength determiner by varying the frequency of the elastic wave.

9 Claims, 7 Drawing Sheets

DEFECT DETECTION DEVICE AND DEFECT DETECTION METHOD

CROSS-REFERENCE TO RELATED APPLICATION

This application claims the priority benefit of Japanese application serial no. 2022-009720, filed on Jan. 25, 2022. The entirety of the above-mentioned patent application is hereby incorporated by reference herein and made a part of this specification.

BACKGROUND

Technical Field

The present invention relates to a defect detection device and defect detection method.

Description of Related Art

A defect detection method which employs speckle interferometry or speckle-shearing interferometry has conventionally been proposed (for example, see Patent Literature 1). In speckle interferometry, a beam of laser light from a laser light source is split into illumination light and reference light, and the illumination light is cast onto a test area. The illumination light reflected at each point on the surface of an object to be examined (which is hereinafter called the "test object") within the test area is combined with the reference light to obtain an interference pattern. In speckle-shearing interferometry, the laser beam from the laser light source is cast onto the test area (with no reference light split from the beam), and an interference pattern is obtained from two rays of light reflected from two points located close to each other on the surface of the test object within the test area. In the device and method described in Patent Literature 1, a vibrator is held in contact with the test object and energized to produce vibrations, whereby an elastic wave is continuously induced in the test object. Meanwhile, a displacement in an "off-plane direction" (the direction perpendicular to a plane) of each point (in the case of the speckle interferometry), or a relative displacement in the off-plane direction between two points located close to each other (in the case of the speckle-shearing interferometry), at a specific phase of the elastic wave is measured, using a stroboscopic illumination which is repeatedly turned on, being synchronized with the elastic wave. This measurement operation is performed at least at three different phases of the sinusoidal elastic wave, whereby the entire vibration state of the elastic wave can be reproduced, and a defect within the test area can be detected with a high level of accuracy.

In the device and method described in Patent Literature 1, the larger the amplitude of the elastic wave is, the larger the displacement of each point or the relative displacement between the two points close to each other becomes. Therefore, it is preferable to give the vibration with a frequency close to the resonance frequency of the measurement system consisting of the test object and the vibrator. However, it is difficult for a user to know the resonance frequency beforehand. To solve this problem, in a device and method described in Patent Literature 2, a preliminary measurement is performed in which the impedance of the vibrator is measured while the oscillation frequency of the vibrator is gradually varied. Based on the data obtained by the preliminary measurement, a resonance frequency at which the amplitude of the elastic wave has a peak is presented to the user as a recommended frequency. The resonance frequency depends on the size and material of the test object, while the range across which the oscillation frequency is to be varied depends on the device. In many cases, the measurement system can resonate at a plurality of frequencies within that range. In that case, the amplitude of the elastic wave will also have peaks at a plurality of frequencies, and a plurality of recommended frequencies will be presented.

CITATION LIST

Patent Literature

Patent Literature 1: JP 2017-219318 A
Patent Literature 2: WO 2021/145034 A

If the wavelength of the elastic wave induced in the test object is too long (i.e., the frequency is too low), it may be impossible to detect a defect. For example, when the defect is a crack, it has empirically been known that the defect cannot be correctly detected if the wavelength of the elastic wave is longer than seven times the length of the crack. Another example is the partial separation of a coating film applied to the surface of the test object; when the coating film is considered to be a portion of the test object, the area of the separation can be regarded as a defect on the test object. This type of defect due to the separation of a coating film cannot be correctly detected if one half of the wavelength of the elastic wave is longer than the size across the area where the coating has been separated. On the other hand, vibrators generally have the characteristic that the shorter the wavelength of the elastic wave is (i.e., the higher the frequency is), the smaller the amplitude of the elastic wave that can be given to the test object becomes. Therefore, it is preferable that the wavelength be as long as possible (the frequency be as low as possible) within a range where defects can be correctly detected.

As described thus far, in order to correctly detect a defect in a test object, it is necessary to appropriately set the frequency of the elastic wave to be given to the test object. However, in the device and method described in Patent Literature 2, the plurality of recommended frequencies presented to the user are nothing more than a plurality of frequencies at each of which the amplitude of the vibration in the test object has a peak. It is difficult for the user to determine which of those frequencies is the most appropriate frequency for defect detection.

SUMMARY

The problem to be solved by the present invention is to provide a defect detection device and method which enables the setting of an appropriate frequency for defect detection.

The defect detection device according to the present invention developed for solving the previously described problem includes:
  an input receiver configured to receive an input, by a user, of information concerning the kind and size of a defect expected to be present in or on a test object;
  an exciter configured to induce an elastic wave in the test object, with the frequency of the elastic wave being variable;
  a measurer configured to measure, by an optical means, a vibration state of the surface of the test object caused by the elastic wave;
  a wavelength determiner configured to determine the wavelength of the elastic wave induced in the test object, based on the vibration state obtained by the measurer; and a frequency selector configured to select an appropriate frequency from a plurality of frequencies, based on the kind and size of the defect received by the input receiver as well as the wavelength acquired for each of the plurality of frequencies by the wavelength determiner by varying the frequency of the elastic wave induced by the exciter.

The defect detection method according to the present invention includes:

a frequency-specified vibration state acquisition step for acquiring a vibration state of a test object at each of a plurality of frequencies, by inducing an elastic wave in the test object and measuring, by an optical means, a vibration state of the surface of the test object caused by the elastic wave while varying the frequency of the elastic wave;

a frequency-specified wavelength acquisition step for acquiring, for each of the plurality of frequencies, the wavelength of the elastic wave induced in the test object from the vibration state acquired in the frequency-specified vibration state acquisition step; and a frequency selection step for selecting an appropriate frequency from the plurality of frequencies, based on the kind and size of a defect expected to be present in the test object as well as the wavelength acquired for each of the plurality of frequencies.

By the defect detection device and method according to the present invention, an appropriate frequency for defect detection according to the kind and size of a defect expected to be present in a test object can be set by selecting the frequency based on the kind and size of the expected defect as well as the wavelength acquired for each of the plurality of frequencies by the wavelength determiner while varying the frequency of the elastic wave induced by the exciter.

Examples of the kind of defect include a crack or the separation of a coating film in or on a test object. The size of the defect to be entered by the user may be a rough numerical value, which may be a single numerical value or a numerical range. In the case where a single numerical value is entered as the size of the defect, the selection of the frequency should preferably be performed based on a numerical range having a predetermined width including the entered numerical value. The appropriate frequency for defect detection can be determined, for example, by defining a frequency range by multiplying each of the upper and lower limit values of the range of the size of the expected defect by a respective coefficient determined according to the kind of expected defect, locating a plurality of frequencies at each of which the measured amplitude has a peak, and selecting one or more of those frequencies within the aforementioned frequency range.

DESCRIPTION OF THE EMBODIMENTS

Embodiments of the defect detection device and method according to the present invention are hereinafter described using FIGS. 1-8.

(1) Configuration of Defect Detection Device According to First Embodiment

Figure 1:
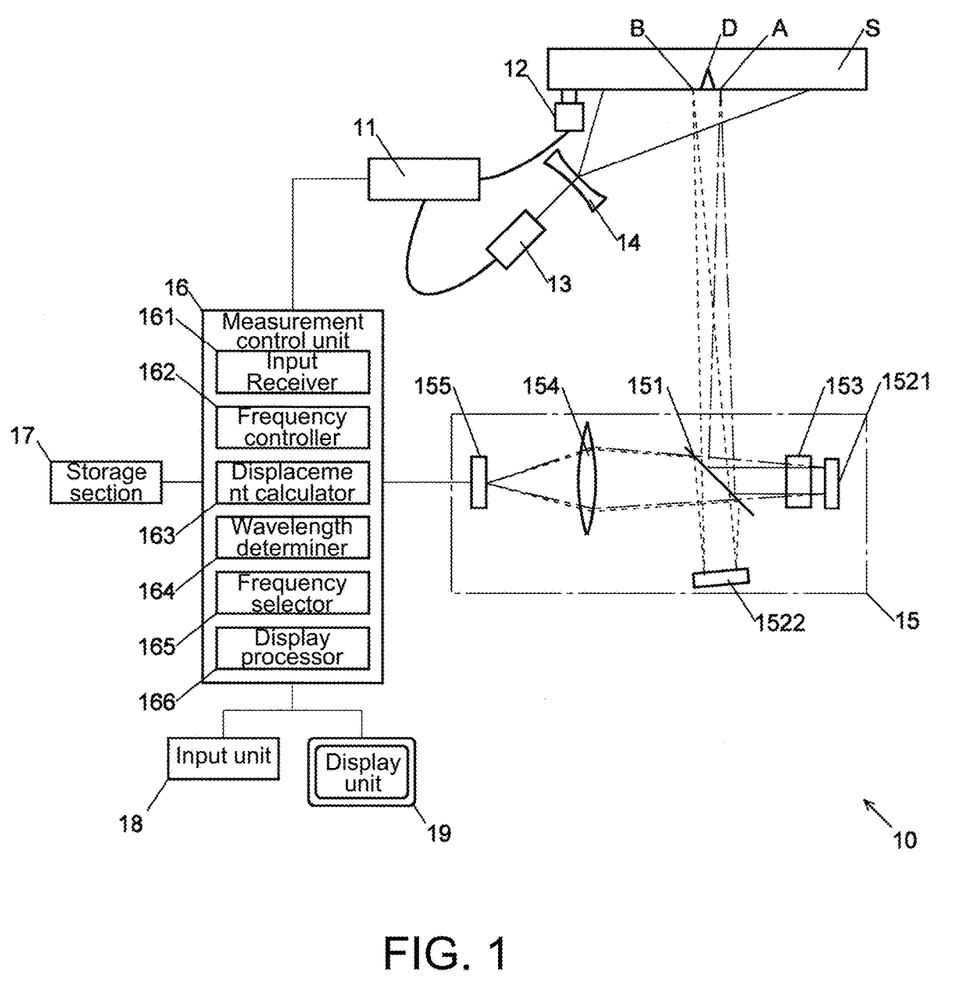
FIG. 1 is a schematic configuration diagram showing the first embodiment of the defect detection device according to the present invention.

The present defect detection device 10 includes a signal generator 11, vibrator 12, pulse laser light source 13, illumination light lens 14, speckle-shearing interferometer 15, measurement control unit 16, storage unit 17, input unit 18 and display unit 19.

The signal generator 11, which is connected to the vibrator 12 by a cable, generates an AC electric signal and sends it to the vibrator 12. The frequency of this AC electric signal can be varied and will be set by the measurement control unit 16, as will be described later. When in use, the vibrator 12 is held in contact with a test object S, receives the AC electric signal from the signal generator 11 and converts it into a mechanical vibration having the aforementioned frequency, to give the mechanical vibration to the test object S. In this manner, an elastic wave having the aforementioned frequency, i.e., the frequency set by the measurement control unit 16, is induced in the test object S. The signal generator 11 and the vibrator 12 correspond to the aforementioned exciter.

The signal generator 11 is also connected with the pulse laser light source 13 by a cable separate from the cable connected to the vibrator 12. The signal generator 11 sends a pulsed electric signal (pulse signal) to the pulse laser light source 13 at a timing when the AC electric signal is at a predetermined phase. The predetermined phase and the thereby determined timing are set by the measurement control unit 16, as will be described later. The pulse laser light source 13 is a light source configured to emit pulse laser light upon receiving a pulse signal from the signal generator 11. The illumination light lens 14 is a concave lens located between the pulse laser light source 13 and the test object S. The illumination light lens 14 serves to expand the pulse laser light from the pulse laser light source 13 onto the entire measurement area on the surface of the test object S. The pulse laser light source 13 and the illumination light lens 14 form a system for illuminating the surface of the test object S in a stroboscopic manner. This system is included in the measurer mentioned earlier.

The speckle-shearing interferometer 15, which corresponds to the measurer mentioned earlier, includes a beam splitter 151, first reflector 1521, second reflector 1522, phase shifter 153, converging lens 154 and image sensor 155. The beam splitter 151 is a half mirror located at a position where it can receive the illumination light reflected by the measurement area on the surface of the test object S. The first reflector 1521 is located on the optical path of the illumination light reflected by the beam splitter 151, while the second reflector 1522 is located on the optical path of the illumination light passing through the beam splitter 151. The phase shifter 153, which is located between the beam splitter 151 and the first reflector 1521, is configured to change (shift) the phase of the light passing through the phase shifter 153. The image sensor 155 is located on an optical path which is common to both the illumination light which is initially reflected by the beam splitter 151 and subsequently by the first reflector 1521 to ultimately pass through the beam splitter 151, and the illumination light which initially passes through the beam splitter 151 and is subsequently reflected by the second reflector 1522 to be ultimately reflected by the beam splitter 151. The converging lens 154 is located between the beam splitter 151 and the image sensor 155.

The first reflector 1521 is arranged so that its reflecting surface is at an angle of 45 degrees to the reflecting surface of the beam splitter 151. On the other hand, the second reflector 1522 is arranged so that its reflecting surface is slightly tilted from the angle of 45° to the reflecting surface of the beam splitter 151. Due to this arrangement of the first reflector 1521 and the second reflector 1522, the illumination light (indicated by the long dashed short dashed line in FIG. 1) which is reflected by point A on the surface of the test object S and also by the first reflector 1521 hits the same point on the image sensor 155 as the illumination light (indicated by the broken line) which is reflected by point B, which is slightly displaced from point A on the surface, and also by the second reflector 1522, whereby interference of light occurs. The image sensor 155, which has a large number of detection elements, detects rays of light coming from a large number of points (represented by point A mentioned earlier) on the surface of the test object S and falling onto the image sensor 155 via the first reflector 1521 and the phase shifter 153, with each ray of light detected by a different detection element. The same also applies to point B: each of the rays of light coming from a large number of points and falling onto the image sensor 155 via the second reflector 1522 is detected by a different detection element.

The input unit 18 is an input device, such as a keyboard, mouse, touch panel or a combination of two or more of those devices. It serves as a means for a user to input the kind and size of a defect expected to be present in the test object S as well as other related kinds of information. The display unit 19 is a display device for displaying a setting screen including input fields for the aforementioned kinds of information as well as a screen for showing a measured result or other forms of visual information.

The measurement control unit 16 includes an input receiver 161, frequency controller 162, displacement calculator 163, wavelength determiner 165 and display processor 166. The measurement control unit 16 is embodied by a central processing unit (CPU) and other related hardware devices as well as a software product for executing the related operations. The components (functional blocks) of the measurement control unit 16 are hereinafter described.

The input receiver 161 receives an input of various kinds of information by the user through the input unit 18, such as the kind and size of a defect, and sends those pieces of information to the frequency selector 165.

The frequency controller 162 controls the frequency of the AC electric signal sent from the signal generator 11 to the vibrator 12, i.e., the frequency of the elastic wave to be induced in the test object S by the vibrator 12. During the operation of setting an appropriate frequency for defect detection, the frequency controller 162 controls related sections so as to vary the frequency of the AC electric signal (and consequently, the frequency of the elastic wave induced in the test object S) over a plurality of numerical values within a predetermined range. After a frequency has been selected by the frequency selector 165 as will be described later, when a measurement for defect detection is performed, the frequency controller 162 sets the frequency of the AC electric signal at the selected value.

The displacement calculator 163 performs the operation of determining the displacement in the off-plane direction at each point on the surface of the test object S by speckle-shearing interferometry, based on the detection signal obtained from each detection element of the image sensor 155. During the operation of setting an appropriate frequency for defect detection, the displacement calculator 163 acquires the displacement in the off-plane direction at each point on the surface of the test object S for each of the frequencies (points in time) while the frequency of the elastic wave induced in the test object S is sequentially varied over those frequencies by the frequency controller 162. When a measurement for defect detection is performed, the displacement calculator 163 acquires the displacement in the off-plane direction at each point on the surface of the test object S obtained at the frequency selected by the frequency selector 165.

The wavelength determiner 164 determines the wavelength of the elastic wave induced in the test object S, based on the displacement in the off-plane direction at each point on the surface of the test object S acquired by the displacement calculator 163 for each frequency during the operation of setting an appropriate frequency for defect detection. The method for determining the wavelength will be described later.

The frequency selector 165 selects an appropriate frequency from a plurality of frequencies, based on the kind and size of the defect expected to be present in the test object S which have been received by the input receiver 161 as well as the wavelength of the elastic wave determined for each of the plurality of frequencies by the wavelength determiner 164 during the operation of setting an appropriate frequency for defect detection. For example, if the kind of defect received by the input receiver 161 is the "crack", a frequency at which the wavelength determined by the wavelength determiner 164 is equal to or shorter than seven times the size of the defect by through the input receiver 161 is selected from the plurality of frequencies. If the kind of defect is the "separation of the coating film", a frequency at which the wavelength is equal to or shorter than one half of the size of the defect is selected from the plurality of frequencies. Regardless of whether the kind of defect is the crack or the separation of the coating film, if there are two or more frequencies selected, the frequency which yields the largest amplitude of vibration as determined based on the displacement of each measurement point obtained by the displacement calculator 163 may preferably be selected as the appropriate frequency among those frequencies.

The display processor 166 performs the process of displaying, on the display unit 19, a setting screen including input fields for the kind and size of the defect and other related kinds of information, a screen for showing a measured result, as well as other forms of visual information. An example of the measured result to be displayed on the display unit 19 is a two-dimensional map on which the distribution of the displacement in the off-plane direction at each point on the surface of the test object S is represented by a color-shading pattern (or other visual forms). When the operation of setting an appropriate frequency for defect detection has been performed, the measured result to be displayed may be the measured result obtained at a single frequency selected by the frequency selector 165, or a plurality of measured results respectively obtained at a plurality of frequencies. In the former case, the user can visually examine the distribution of the displacement in the off-plane direction displayed as the measured result and locate a defect, for example, at a portion where there is a spatial discontinuity in the distribution of the displacement. In the latter case, it is preferable to visually highlight the measured result obtained at the appropriate frequency for defect detection among the plurality of measured results.

The storage section 17 is used for storing measurement data, such as the strength values of the detection signal obtained from each detection element of the image sensor 155. Along with or in place of the measurement data (raw data), a value representing the displacement in the off-plane direction at each point on the surface of the test object S calculated by the displacement calculator 163 may be stored in the storage section 17.

Figure 2:
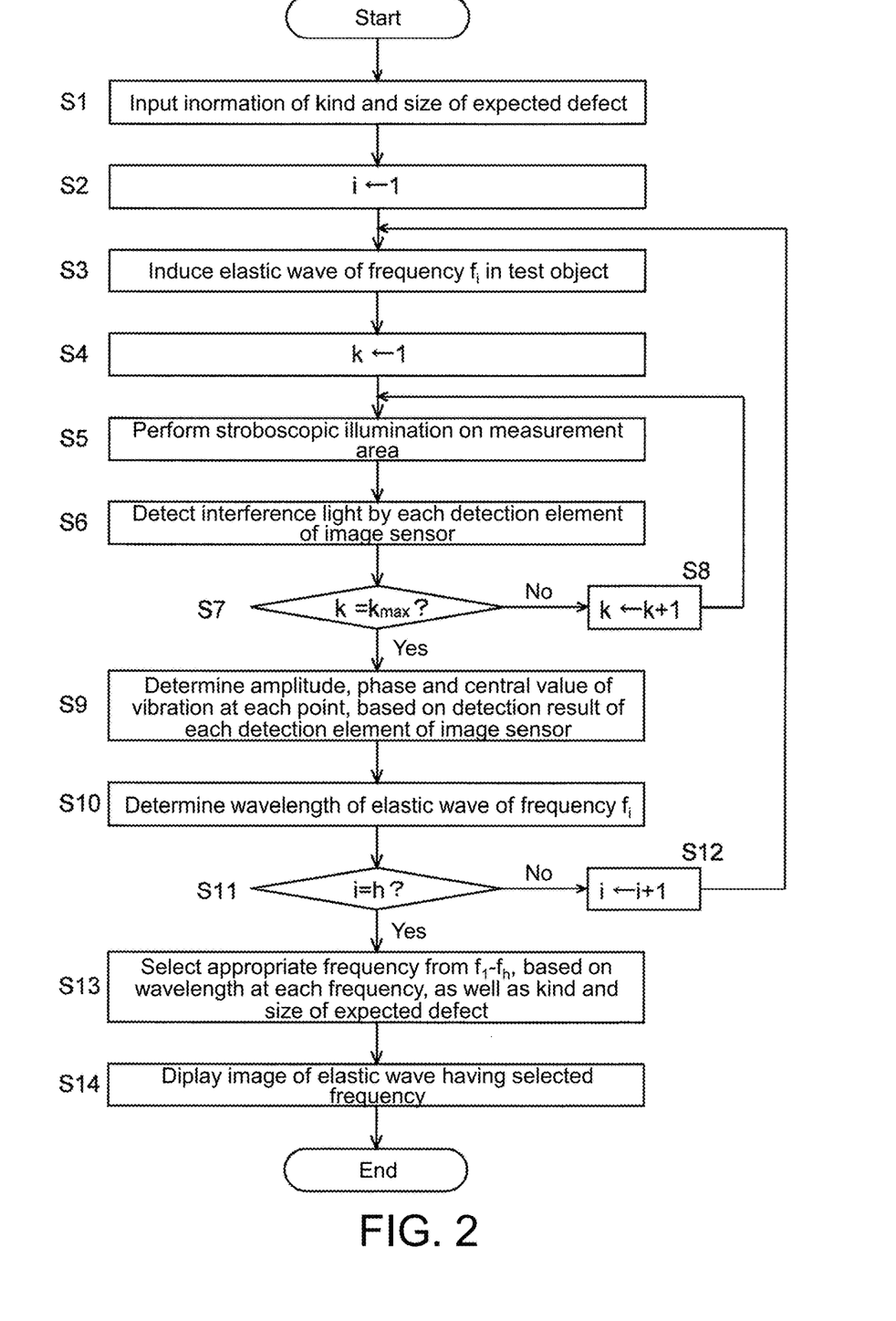
FIG. 2 is a flowchart showing an operation of the defect detection device and the defect detection method according to the first embodiment.
Figure 3:
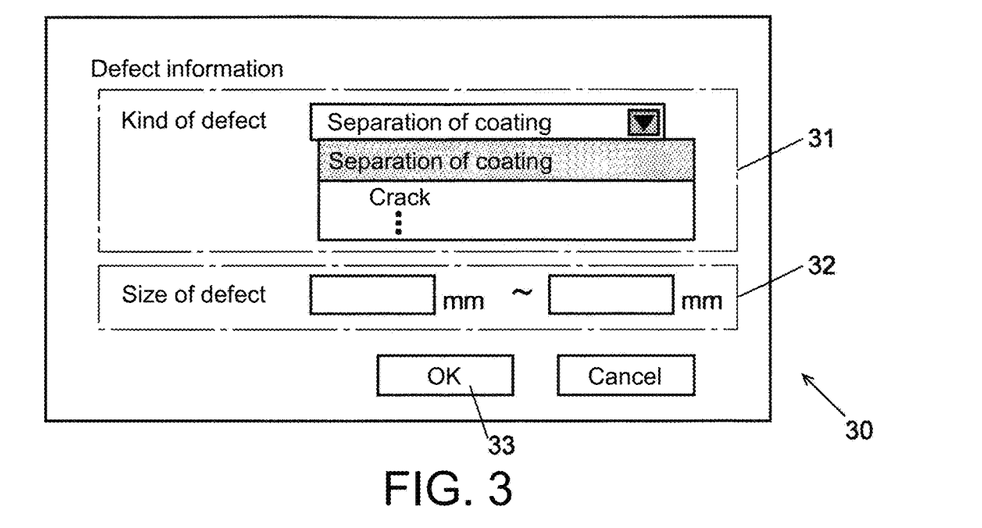
FIG. 3 is a diagram showing an example of a setting screen to be displayed in a display unit in the defect detection device according to the first embodiment.
Figure 4:
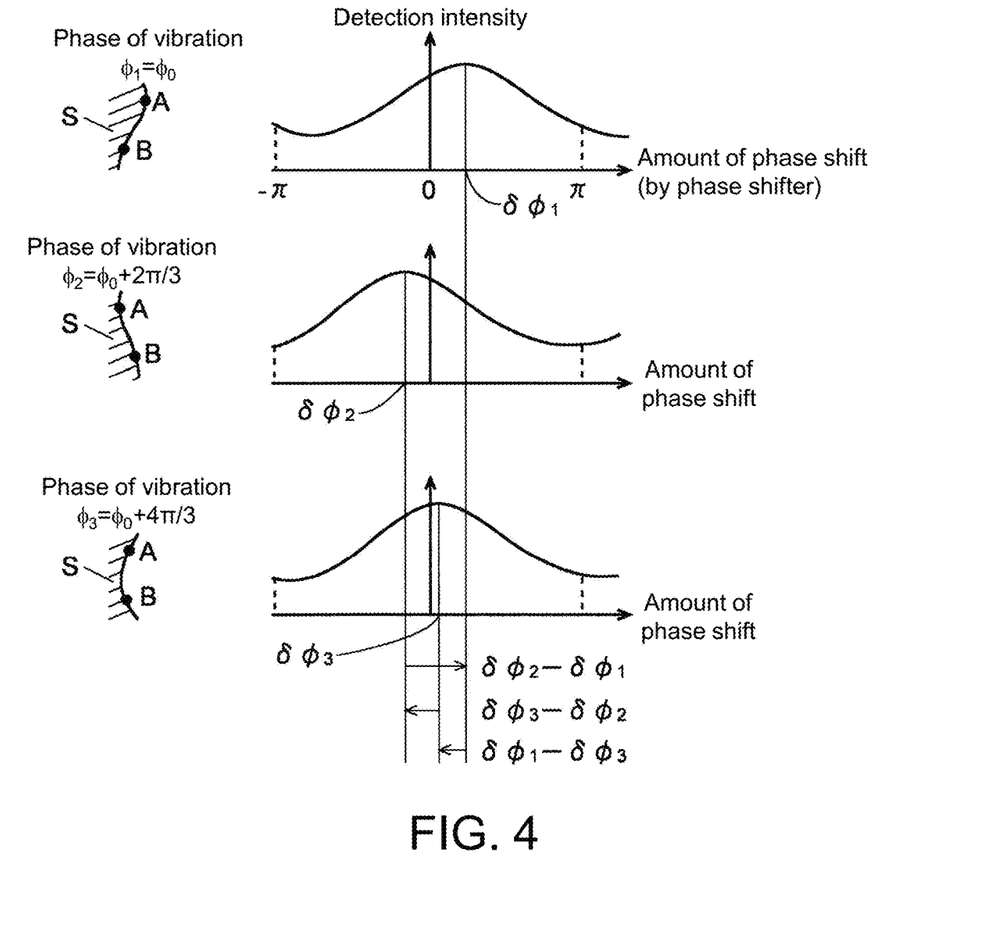
FIG. 4 is a diagram for explaining a method for determining the displacement of the surface of a test object in the defect detection device according to the first embodiment.
Figure 5:
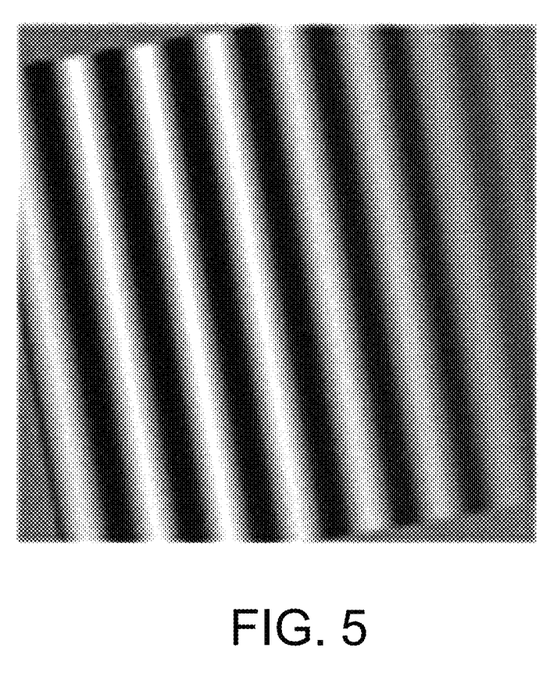
FIG. 5 is an example of an image showing the state of vibration on the surface of a test object, obtained in the defect detection device according to the first embodiment.

(2) Operation of Defect Detection Device and Defect Detection Method According to First Embodiment Referring to the flowchart in FIG. 2 as well as the illustrative drawings and image in FIGS. 3 through 5, an operation of the defect detection device 10 and the defect detection method according to the present embodiment are hereinafter described.

Initially, a user places a test object S at a predetermined position in the defect detection device 10 and brings the vibrator 12 into contact with the test object S. Subsequently, the user performs a predetermined operation using the input unit 18, whereby a sequence of operations is initiated.

The display processor 166 displays an expected-defect information input screen, which is a screen for a user to input the information of the kind and size of a defect expected to be present in the test object. The user enters those pieces of information through the input unit 18 (Step S1). FIG. 3 shows one example of the expected-defect information input screen. The expected-defect information input screen 30 in the present example has a defect-kind input area 31 for entering the kind of expected defect and a defect-size input area 32 for entering an expected range of the size of the defect. The defect-kind input area 31 shows a plurality of candidates of the kind of defect by a pulldown list, allowing the user to make a selection from those candidates by operating the mouse or touch panel in the input unit 18. The defect-size input area 32 shows two boxes for entering the smallest and largest values of the size across the expected defect, into which the user enters numerical values of the smallest and largest values using the keyboard (or the like) in the input unit 18. When the same numerical value is entered as both the largest and smallest values, that single numerical value of the size across the defect is set in place of a numerical range.

After the input of the kind and size of the defect has been completed, the user presses the "OK" button 33 in the expected-defect information input screen 30. Then, as will be described later, the frequency controller 162 operates the signal generator 11 so as to send an AC electric signal to the vibrator 12, with the frequency of the signal sequentially set at a plurality of frequencies $f_1, f_2, \ldots$ and $f_h$ (where h is an integer equal to or greater than two) within a predetermined frequency range (in the present embodiment, from 20 kHz to 400 kHz, although the frequency range is not limited to this example). The plurality of frequencies $f_1, f_2, \ldots$ and $f_h$ used in the first embodiment are values which have been previously set (regardless of the shape, size, material and other features of the test object S).

Initially, the frequency controller 162 set the iterator to 1, i.e., i=1 (Step S2), and operates the signal generator 11 to send an AC electric signal of frequency $f_i$ (which is $f_1$ at this stage) to the vibrator 12. Upon receiving the AC electric signal from the signal generator 11, the vibrator 12 generates a vibration having frequency $f_i$. The vibration of the vibrator 12 is transmitted to the test object S which the vibrator 12 is in contact with, whereby an elastic wave having frequency $f_i$ is induced in the test object S (Step S3).

In this state, the displacement in the off-plane direction at each point on the surface of the test object S is measured at each of the $k_{max}$ phases which are different from each other (where $k_{max}$ is an integer equal to or greater than three) by the following method. The $k_{max}$ phases are hereinafter expressed by $\phi_k=[\phi_0+2\pi(k-1)/k_{max}]$, where $\phi_0$ is an appropriate initial value (e.g., $\phi_0=0$) and k is an integer from 1 to $k_{max}$. Initially, the value of k is set to 1 (Step S4), and the signal generator 11 sends a pulse signal to the pulse laser light source 13 at each timing when the phase of the elastic wave is equal to $\phi_1=\phi_0$. The pulse laser light source 13 repeatedly emits illumination light, or pulse laser light, every time it receives the pulse signal (stroboscopic illumination). This illumination light is expanded by the illumination light lens 14 and cast onto the entire measurement area on the surface of the test object S (Step S5).

The illumination light is reflected on the surface of the test object S and enters the beam splitter 151 in the speckle-shearing interferometer 15. A portion of this illumination light is reflected by the beam splitter 151 and passes through the phase shifter 153. After being reflected by the first reflector 1521, the same light once more passes through the phase shifter 153, and a portion of this light passes through the beam splitter 151 and falls onto the image sensor 155. The remaining portion of the illumination light which entered the beam splitter 151 for the first time passes through the beam splitter 151. After being reflected by the second reflector 1522, a portion of this light is reflected by the beam splitter 151 and falls onto the image sensor 155. In the image sensor 155, each of the rays of illumination light reflected by a large number of points on the surface of the test object S is individually detected by a different detection element.

While the illumination light, which is a pulsed laser light, is repeatedly emitted, the phase shifter 153 is operated to gradually change (shift) the phase of the illumination light passing through the phase shifter 153 (i.e., the illumination light reflected by point A). Consequently, the phase difference between the illumination light reflected by point A and the one reflected by point B gradually changes. During this change, each detection element of the image sensor 155 detects the interference light resulting from the interference of the two rays of illumination light and determines its intensity (Step S6). The upper diagram in FIG. 4 graphically shows one example of the amount of phase shift by the phase shifter 153 and the intensity of the interference light detected with a detection element of the image sensor 155 when the phase of the vibration of the vibrator 12 is $\phi_1$. In FIG. 4, the relationship in which the detection intensity sinusoidally changes with respect to the amount of phase shift is represented by a continuous curve. However, the actually observed data are in a discrete form, and the continuous sinusoidal wave is reproduced from the observed data by the least-square method or other appropriate methods. To this end, it is necessary to detect the intensity with at least three different amounts of phase shift.

The operations of Steps S5 and S6 are similarly performed for each value of k from 2 to $k_{max}$ (i.e., after the determination result in Step S7 has been "NO", the value of k is increased by one in Step S8, and the operations of Steps S5 and S6 are once more performed). For example, in the case of $k_{max}=3$, the signal generator 11 sends a pulse signal to the pulse laser light source 13 at each timing when the phase of the elastic wave is equal to $\phi_2=\phi_0+2\pi/3$ (when k=2) or $\phi_3=\phi_0+4\pi/3$ (when k=3), whereby the illumination light is repeatedly cast onto the entire measurement area on the surface of the test object S. Meanwhile, the phase shifter 153 gradually shifts the phase of the illumination light passing through itself, and each detection element of the image sensor 155 detects the intensity of the interference light. The middle and lower diagrams in FIG. 4 graphically show examples of the relationship between the amount of phase shift and the intensity of the interference light when the phase of the vibration of the vibrator 12 is $\phi_2$ (middle diagram) or $\phi_3$ (lower diagram) in the case of $k_{max}=3$.

After the operations of Steps S5 and S6 have been performed for all values of k from 1 to $k_{max}$ in the previously described manner (and the determination result in Step S7 has been "YES"), the displacement calculator 163 determines, for each detection element of the image sensor 155 and for each phase $\phi_1$ to $\phi_{kmax}$ of the vibration, the maximum output phase shifts $\delta\phi_1$ to $\delta\phi_{kmax}$ at which the output of the detection element is maximized within the period in which the amount of phase shift was changed by the phase shifter 153. Based on those maximum output phase shifts, the displacement calculator 163 determines the difference in maximum output phase shift between each different pair of the phases of the vibration. For example, in the case of $k_{max}=3$, three values of the difference in maximum output phase shift are obtained, i.e., $(\delta\phi_2-\delta\phi_1)$, $(\delta\phi_3-\delta\phi_2)$ and $(\delta\phi_1-\delta\phi_3)$. Those differences in maximum output phase shift show three (or more) relative displacements of points A and B in the off-plane direction by means of three (or more) sets of data obtained at different phases of the vibration of the vibrator 12 (i.e., at different points in time). Based on these three (or more) relative displacements, the values of the following three parameters showing the vibration state of the test object S can be obtained for each point within the measurement area: the amplitude of the vibration, phase of the vibration, and central value (DC component) of the vibration (Step S9, which corresponds to the frequency-specified vibration state acquisition step mentioned earlier).

Given these three parameters, it is possible to accurately reproduce the state of vibration at each point. For example, as shown in FIG. 5, an image of an elastic wave induced within the measurement area on the surface of the test object S can be created. The wavelength determiner 164 performs an image analysis based on this image of the elastic wave to determine the wavelength of the elastic wave of wavelength $f_i$, which is $f_1$ at this point in time (Step S10, which corresponds to the frequency-specified wavelength acquisition step mentioned earlier).

At this point in time, the value of i has not yet reached the highest value h ("NO" in Step S11). Therefore, the value of i is increased by one (Step S12), and the operations of Steps S3 through S10 are once more performed to determine the wavelength and the amplitude of the elastic wave of frequency $f_i$. This sequence of operations is repeated until i=h. After the operations of Steps S3 through S10 for i=h have been completed ("YES" in Step S11), the frequency selector 165 selects an appropriate frequency from frequencies $f_1$ to $f_h$ based on the wavelength of the elastic wave at each of the frequencies $f_1$ to $f_h$ determined by the wavelength determiner 164 as well as the kind and size of the defect received by the input receiver 161 (Step S13, which corresponds to the frequency selection step mentioned earlier). As noted earlier, when the kind of expected defect is the crack, a frequency which yields the largest value of the amplitude of the elastic wave should be selected under the condition that the wavelength of the elastic wave is equal to or shorter than seven times the size of the expected defect. When the kind of expected defect is the separation of the coating film, a frequency at which the largest value of the amplitude has been obtained in Step S9 should preferably be selected under the condition that the wavelength of the elastic wave is equal to or shorter than one half of the size of the expected defect.

After a frequency has been thus selected, the display processor 166 performs the process of displaying the image of the elastic wave created at the selected frequency, i.e., at an appropriate frequency for defect detection, within the measurement area on the surface of the test object S, along with the numerical value of the selected frequency on the display unit 19 (Step S14). The user visually examines this image of the elastic wave and searches for a portion at which the waveform of the elastic wave is different from the surrounding area, or a portion at which there is a discontinuity in the spatial change of the waveform. If such a portion is present, the user can conclude that a defect is present at that portion. It is also possible to analytically process the displayed image to detect a defect and superpose a symbol (or the like) on the image to indicate the portion at which the defect has been detected.

With the operations described thus far, the entire operation of the defect detection device 10 according to the present embodiment and the defect detection method according to the present embodiment is completed.

In the case of performing a measurement on a plurality of test objects in which the same kind and size of the defect is expected to be present, if those objects are identical in the kind of material and shape as well as roughly identical in size (which will be described later), the operations of Steps S1 through S14 only need to be performed in the measurement of the first test object. For the measurement of the second and subsequent test objects, the frequency selected in the first measurement can be used.

By the defect detection device 10 according to the present embodiment and the defect detection method according to the present embodiment, an appropriate frequency for defect detection can be set according to the kind and size of the expected defect, by selecting a frequency based on the wavelength acquired for each of a plurality of frequencies by the wavelength determiner 164 as well as the kind and size of the defect expected to be present in the test object S.

(3) Defect Detection Device and Method According to Second Embodiment

Figure 6:
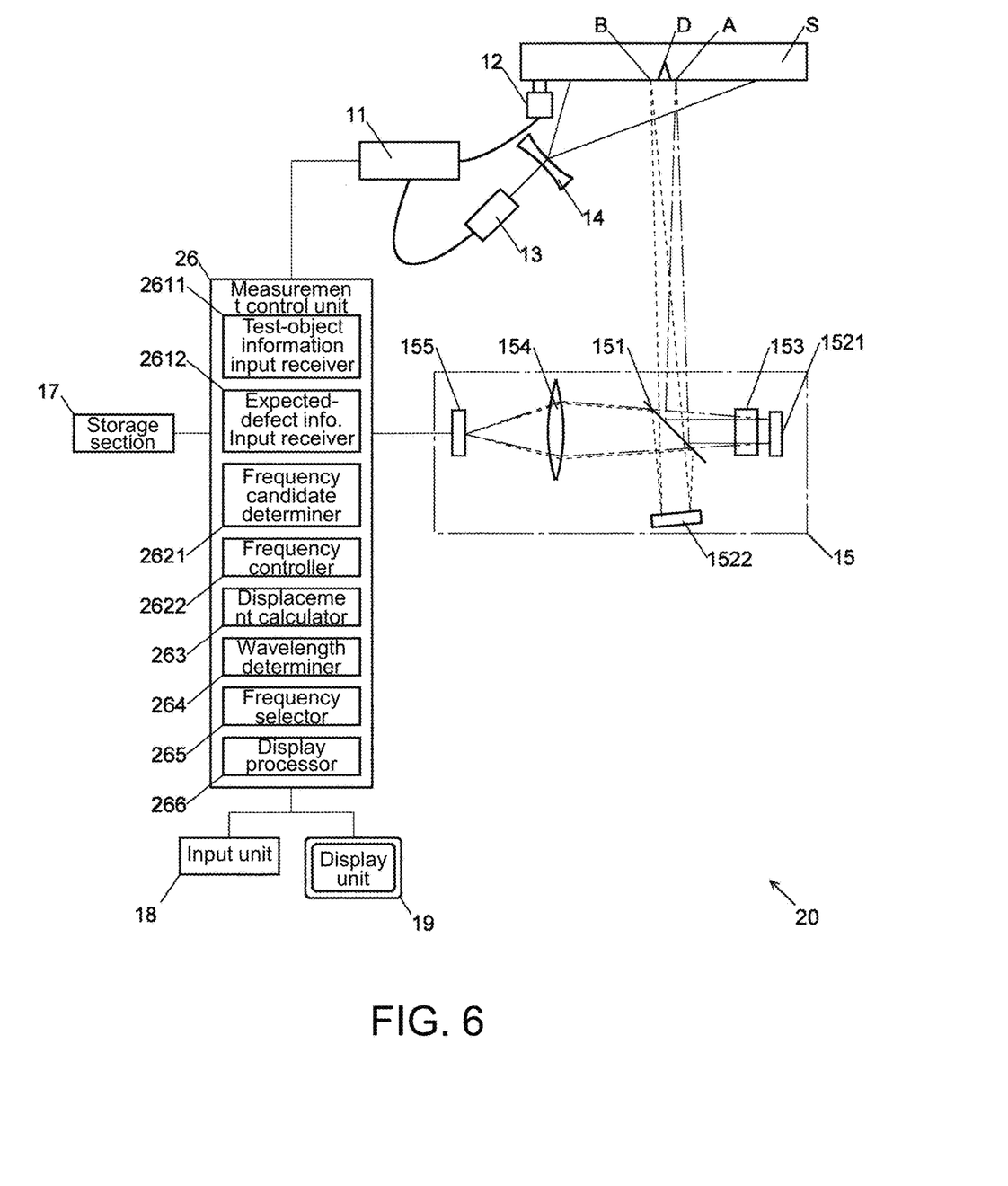
FIG. 6 is a schematic configuration diagram showing the second embodiment of the defect detection device according to the present invention.

FIG. 6 shows a defect detection device 20 according to another embodiment of the present invention. This defect detection device 20 includes a measurement control unit 26 having functional blocks which are different from those of the measurement control unit 16 in the defect detection device 10 according to the first embodiment. The configurations of the components other than the measurement control unit 26 are identical to those of the defect detection device 10 according to the first embodiment. Therefore, detailed descriptions of those components will be omitted.

The measurement control unit 26 includes a test-object information input receiver 2611, expected-defect information input receiver 2612, frequency candidate determiner 2651, frequency controller 2622, displacement calculator 263, wavelength determiner 264, frequency selector 265, and display processor 266.

The test-object information input receiver 2611 receives parameters concerning the shape, material and size of the test object entered by the user through the input unit 18. Examples of the shape of the test object include the plate-like, bulk-like and tubular shapes. Those shapes are shown in the form of a list on the display unit 19, from which the user makes a selection using the input unit 18. As for the material of the test object, various kinds of materials, including iron and concrete, are shown in the form of a list on the display unit 19, from which the user makes a selection using the input unit 18. As for the size of the test object, the information to be entered should include at least a numerical value representing the thickness of the plate for a plate-shaped object, or numerical values representing the outer and inner diameters (or the wall thickness and the outer or inner diameter) of the tube for a tubular object.

The expected-defect information input receiver 2612 receives an input of the kind and size of the expected defect by the user through the input unit 18, as with the input receiver 161 in the defect detection device 10 according to the first embodiment.

The frequency candidate determiner 1621 estimates a suitable range of frequency for defect detection and determines a plurality of frequency candidates within that range, based on the shape, material and size of the test object S received by the test-object information input receiver 2611 as well as the kind and size of the expected defect received by the expected-defect information input receiver 2612.

Specifically, the acoustic velocity of the elastic wave which occurs in the test object S is calculated based on the shape and material of the test object S. Additionally, a wavelength range suitable for defect detection is estimated based on the kind and size of the expected defect. From the acoustic velocity and the wavelength range of the elastic wave, a frequency range that is considered to be suitable for detecting the defect can be determined. When a plurality of frequency candidates are to be determined within that frequency range, a resonance frequency of the vibrator may preferably be selected as a candidate. This selection is advantageous in that a frequency at which a large amplitude is obtained due to an occurrence of resonance in the measurement system will be ultimately selected, so that the detection of a defect will be even easier.

For example, the acoustic velocity of the elastic wave can be determined as follows: When the test object S has a plate-like shape, the acoustic velocity (phase velocity) of the elastic wave is calculated by solving an equation called the "Rayleigh-Lamb" frequency equation in a vibration mode called the "A0 mode" in which the phase of the vibration in the off-plane direction is identical on both sides of the plate. For this calculation, three parameters are used: the acoustic velocity of the longitudinal wave and that of the transversal wave as determined by the material of the test object S without considering the shape of the plate (which are hereinafter simply called the "longitudinal" and "transversal" acoustic velocities), and the thickness of the plate. When the test object S has a bulk-like shape, the phase velocity is calculated by the Rayleigh-Lamb frequency equation using the longitudinal and transversal acoustic velocities, with the thickness of the plate assumed to be infinite. When the test object S has a tubular shape, the phase velocity of the elastic wave is calculated by solving an equation called the "Gazis" frequency equation in a vibration mode called the "F mode" in which the tube vibrates in one specific radial direction. For this calculation, the longitudinal acoustic velocity, transversal acoustic velocity as well as the outer and inner diameters of the tube are used as parameters.

The frequency controller 2622, displacement calculator 263, wavelength determiner 264, and frequency selector 265 are similar to the frequency controller 162, displacement calculator 163, wavelength determiner 164, and frequency selector 165 in the defect detection device 10 according to the first embodiment, respectively.

Figure 7:
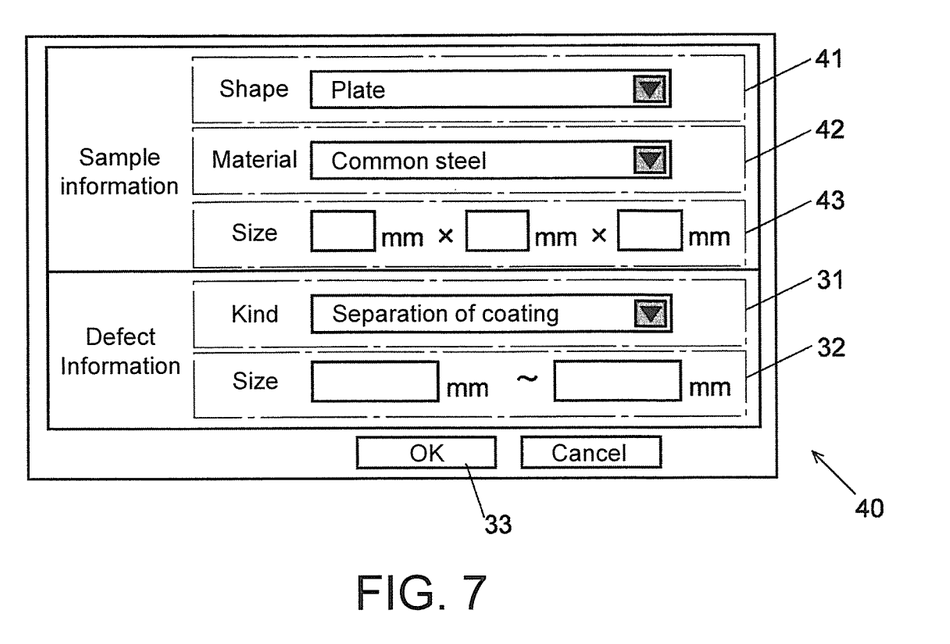
FIG. 7 is a diagram showing an example of a setting screen to be displayed in a display unit in the defect detection device according to the second embodiment.

The display processor 266 is similar to the display processor 166 in the defect detection device 10 according to the first embodiment and performs the process of displaying a setting screen, or a screen showing a measured result or the like on the display unit 19. However, the setting screen displayed by the display processor 266 according to the present embodiment has input fields for the kind and size of the defect and other related pieces of information, as well as input fields for the parameters concerning the shape, material and size of the test object. FIG. 7 shows an example of the input screen. In addition to the defect-kind input area 31 and the defect-size input area 32, the input screen 40 in this example has a test-object-shape input area 41 for entering the shape of the test object S, a test-object-material input area 42 for entering the material of the test object S, and a test-object-size input area 43 for entering the size of the test object S.

Figure 8:
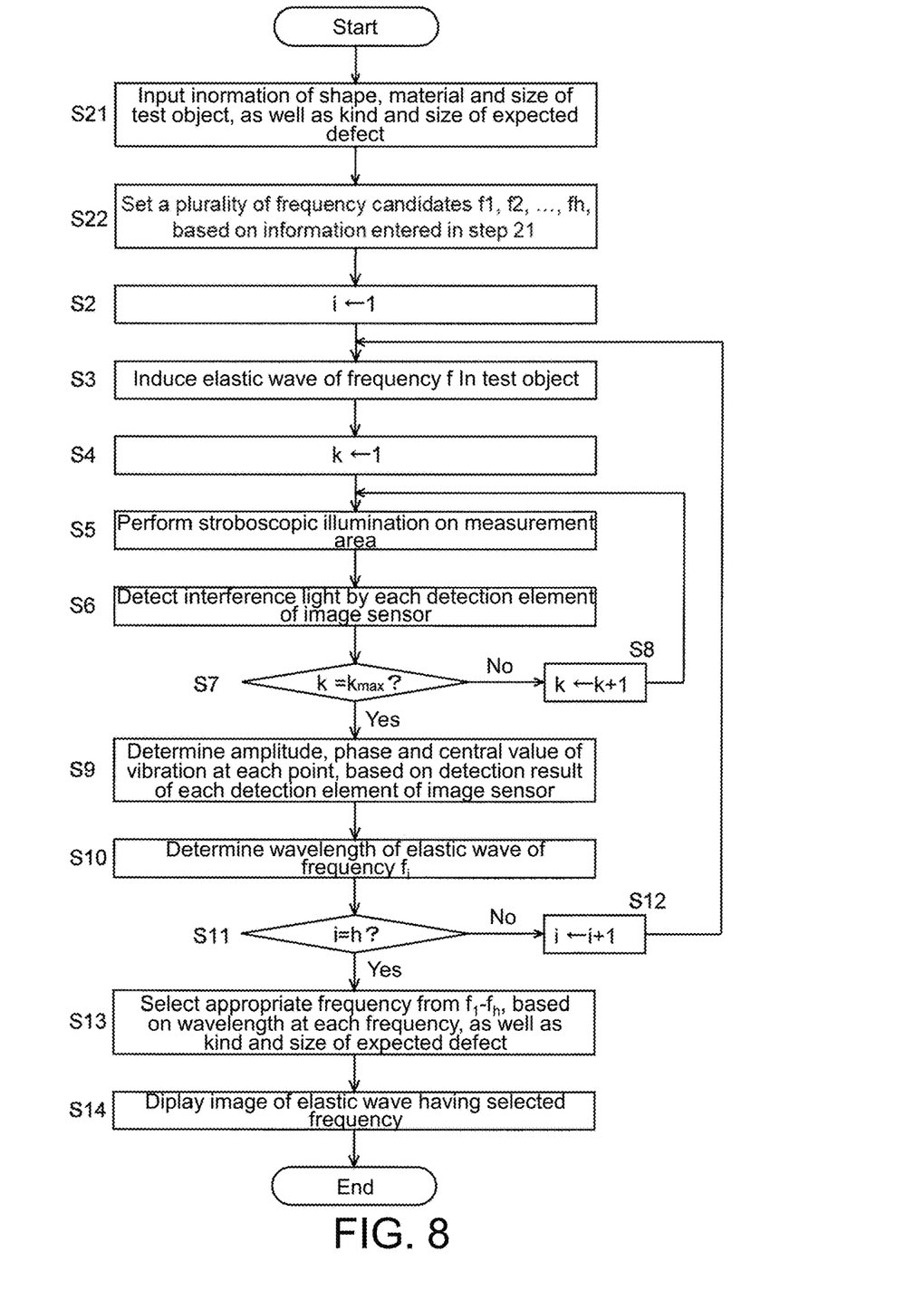
FIG. 8 is a flowchart showing an operation of the defect detection device and the defect detection method according to the second embodiment.

An operation of the defect detection device 20 according to the second embodiment is shown by the flowchart in FIG. 8. In FIG. 8, the same step number as used in the flowchart in FIG. 2 denotes the step which performs the same operation as in the corresponding step in FIG. 2 which shows the operation of the defect detection device 10 according to the first embodiment.

A user places a test object S at a predetermined position in the defect detection device 20 and brings the vibrator 12 into contact with the test object S. Subsequently, the user performs a predetermined operation using the input unit 18. Then, the display processor 266 displays an input screen as shown in FIG. 7. Using the input unit 18, the user enters the information of the shape, material and size of the test object as well as the kind and size of the expected defect (Step S21).

Based on the shape, material and size of the test object S received by the test-object information input receiver 2611 as well as the kind and size of the expected defect received by the expected-defect information receiver 2612, the frequency candidate determiner 2621 estimates a suitable range of frequency for defect detection and determines a plurality of frequency candidates $f_i = f_1, f_2, \ldots, f_h$ within that range in the previously described manner (Step S22).

After Step S22 has been performed, the operations of Steps S2 through S14 are performed in the same manner as in the defect detection device 10 according to the first embodiment, to acquire an image of an elastic wave created within the measurement area on the surface of the test object S at an appropriate frequency. While the operations of Steps S2 through S12 are iteratively performed from i=1 to i=h, the plurality of frequencies $f_i = f_1, f_2, \ldots, f_h$ determined in Step S22 are sequentially used for determining the wavelength and the amplitude of the elastic wave. By this method, the most appropriate frequency can be selected from the candidates which are considered to be appropriate frequencies determined by the shape, material and size of the test object.

(4) Modified Examples

The present invention is not limited to the previous embodiments but can be modified in various forms.

For example, in the previous embodiments, the displacement in the off-plane direction at each point on the surface of the test object S is measured at least at three different phases ($k_{max}$ phases) so as to accurately reproduce the state of the vibration at each point. However, the wavelength and the amplitude of the elastic wave can be satisfactorily determined even when the accuracy is not so high, and therefore, the displacement in the off-plane direction at each point may be measured at only one phase or two phases. In that case, the image of the elastic wave obtained by the measurement for selecting an appropriate frequency may also be reused for detecting a defect, as in the previous embodiment. However, for an accurate detection of a defect, the operation of measuring the displacement in the off-plane direction at three or more phases in an elastic wave having the selected frequency may additionally be performed after Step S13, and an image of the elastic wave for defect detection may be acquired from the result of this measurement.

In the previous embodiments, only the image of the elastic wave at the selected frequency was displayed. It is also possible to display a plurality of images of the elastic wave at a plurality of frequencies at which the wavelength and/or amplitude of the elastic wave satisfied a predetermined condition, and to allow the user to determine the frequency by selecting one of those images. For example, all images of the elastic wave which satisfy the condition that the wavelength of the elastic wave is equal to or shorter than the size of the expected defect multiplied by seven (in the case of a crack) or one half (in the case of the separation of the coating) may be displayed regardless of the amplitude. The images of the elastic wave at all frequencies at each of which the measurement was performed may also be displayed for the selection by the user.

Although a speckle-shearing interferometer is used as the measurer in the previous embodiments, a different type of optical measurement device may be used as the measurer. For example, a speckle interferometer employing the technique of speckle interferometry described earlier can be used as the measurer in the present invention. A scanning laser-doppler vibrometer may also be used as the measurer.

MODES

It is evident for a person skilled in the art that the previously described illustrative embodiments are specific examples of the following modes of the present invention.
(Clause 1)
A defect detection device according to Clause 1 includes:
an input receiver configured to receive an input, by a user, of information concerning the kind and size of a defect expected to be present in or on a test object;
an exciter configured to induce an elastic wave in the test object, with the frequency of the elastic wave being variable;
a measurer configured to measure, by an optical means, a vibration state of the surface of the test object caused by the elastic wave;
a wavelength determiner configured to determine the wavelength of the elastic wave induced in the test object, based on the vibration state obtained by the measurer; and
a frequency selector configured to select an appropriate frequency from a plurality of frequencies, based on the kind and size of the defect received by the input receiver as well as the wavelength acquired for each of the plurality of frequencies by the wavelength determiner by varying the frequency of the elastic wave induced by the exciter.
(Clause 5)
A defect detection method according to Clause 5 includes:
a frequency-specified vibration state acquisition step for acquiring a vibration state of a test object at each of a plurality of frequencies, by inducing an elastic wave in the test object and measuring, by an optical means, a vibration state of the surface of the test object caused by the elastic wave while varying the frequency of the elastic wave;
a frequency-specified wavelength acquisition step for acquiring, for each of the plurality of frequencies, the wavelength of the elastic wave induced in the test object from the vibration state acquired in the frequency-specified vibration state acquisition step; and
a frequency selection step for selecting an appropriate frequency from the plurality of frequencies, based on the kind and size of a defect expected to be present in the test object as well as the wavelength acquired for each of the plurality of frequencies.

By the defect detection device according to Clause 1 and the defect detection method according to Clause 5, an appropriate frequency for defect detection according to the kind and size of a defect expected to be present in a test object can be set by selecting the frequency based on the kind and size of the expected defect as well as the wavelength acquired for each of the plurality of frequencies by the wavelength determiner while varying the frequency of the elastic wave induced by the exciter.

Examples of the kind of defect include a crack or the separation of a coating film in or on a test object. The size of the defect to be entered by the user may be a rough numerical value, which may be a single numerical value or a numerical range. In the case where a single numerical value is entered as the size of the defect, the selection of the frequency should preferably be performed based on a numerical range having a predetermined width including the entered numerical value. The appropriate frequency for defect detection can be determined, for example, by defining a frequency range by multiplying each of the upper and lower limit values of the range of the size of the expected defect by a respective coefficient determined according to the kind of expected defect, locating a plurality of frequencies at each of which the measured amplitude has a peak, and selecting one or more of those frequencies within the aforementioned frequency range.
(Clause 2)
The defect detection device according to Clause 2, which is one mode of the defect detection device according to Clause 1, further includes:
a test-object information input receiver configured to receive an input, by a user, of information concerning the shape, material and size of the test object; and
a frequency candidate determiner configured to determine a plurality of frequency candidates based on the shape, material and size of the test object received by the test-object information input receiver as well as the kind and size of the expected defect received by the input receiver, where the frequency selector is configured to select the appropriate frequency from the plurality of frequency candidates, based on the kind and size of the defect received by the input receiver as well as the wavelength acquired by the wavelength determiner for each of the plurality of frequency candidates.

(Clause 3)

In the defect detection device according to Clause 3, which is one mode of the defect detection device according to Clause 2, the frequency candidate determiner is configured to determine an acoustic velocity in the test object based on the shape, material and size of the test object, and to determine, as the plurality of frequency candidates, a plurality of frequencies at which an elastic wave is expected to be induced based on the acoustic velocity and the size of the test object.

(Clause 4)

In the defect detection device according to Clause 4, which is one mode of the defect detection device according to Clause 2 or 3, the exciter includes a vibrator configured to give a vibration to the test object, and the frequency candidate determiner is configured to select one or more resonance frequencies of the vibrator as one or more of the plurality of frequency candidates.

In the defect detection device according to Clause 2, the plurality of frequency candidates to be considered for the selection by the frequency selector are determined by the frequency candidate determiner based on the shape, material and size of the test object as well as the kind and size of the expected defect, so that an even more appropriate frequency can be used for the detection of a defect. For that process, in the defect detection device according to Clause 3, an acoustic velocity in the test object is determined based on the shape, material and size of the test object, and a plurality of frequencies at each of which an elastic wave is expected to be induced in the test object based on the acoustic velocity and the size of the test object are determined. By using these frequencies as the plurality of frequency candidates, an appropriate frequency can be selected from the plurality of frequency candidates at which the detection of a defect is easier to achieve since a large amplitude is obtained due to the creation of the elastic wave. In the defect detection device according to Clause 4, one or more resonance frequencies of the vibrator in the exciter are determined as one or more of the plurality of frequency candidates (where the "more" in this context may be equal to the number of all frequency candidates or only some of them). By this method, a frequency at which the amplitude is increased due to the resonance of the measurement system is selected, so that the detection of a defect is easily achieved.

What is claimed is:

1. A defect detection device, comprising:
   an input receiver configured to receive an input, by a user, of information concerning a kind and size of a defect expected to be present in or on a test object;
   an exciter configured to induce an elastic wave in the test object, with a frequency of the elastic wave being variable;
   a measurer configured to measure, by an optical means, a vibration state of a surface of the test object caused by the elastic wave;
   a wavelength determiner configured to determine a wavelength of the elastic wave induced in the test object, based on the vibration state obtained by the measurer; and
   a frequency selector configured to select an appropriate frequency from a plurality of frequencies, based on the kind and size of the defect received by the input receiver as well as the wavelength acquired for each of the plurality of frequencies by the wavelength determiner by varying the frequency of the elastic wave induced by the exciter.

2. The defect detection device according to claim 1, further comprising:
   a test-object information input receiver configured to receive an input, by a user, of information concerning a shape, material and size of the test object; and
   a frequency candidate determiner configured to determine a plurality of frequency candidates based on the shape, material and size of the test object received by the test-object information input receiver as well as the kind and size of the expected defect received by the input receiver,
   wherein the frequency selector is configured to select the appropriate frequency from the plurality of frequency candidates, based on the kind and size of the defect received by the input receiver as well as the wavelength acquired by the wavelength determiner for each of the plurality of frequency candidates.

3. The defect detection device according to claim 2, wherein the frequency candidate determiner is configured to determine an acoustic velocity in the test object based on the shape, material and size of the test object, and to determine, as the plurality of frequency candidates, a plurality of frequencies at which an elastic wave is expected to be induced based on the acoustic velocity and the size of the test object.

4. The defect detection device according to claim 2, wherein:
   the exciter includes a vibrator configured to give a vibration to the test object; and
   the frequency candidate determiner is configured to select one or more resonance frequencies of the vibrator as one or more of the plurality of frequency candidates.

5. The defect detection device according to claim 1, wherein an image of the elastic wave created at the selected appropriate frequency along with a numerical value of the selected appropriate frequency are displayed on a display unit to analytically process the displayed image to detect the defect.

6. The defect detection device according to claim 1, wherein the exciter is configured to induce a plurality of elastic waves in the test object by using a plurality of frequency candidates respectively, wherein the plurality of frequency candidates are within a frequency range suitable for defect detection estimated based on a wavelength range defined based on the kind and size of the defect received by the input receiver,
   the frequency selector is configured to select a frequency which yields a largest value of an amplitude of one of the elastic waves under a condition that a wavelength of the one of the elastic waves is within the wavelength range from the plurality of frequency candidates.

7. A defect detection method, comprising:
   a frequency-specified vibration state acquisition step for acquiring a vibration state of a test object at each of a plurality of frequencies, by inducing an elastic wave in the test object and measuring, by an optical means, a vibration state of a surface of the test object caused by the elastic wave while varying a frequency of the elastic wave;

a frequency-specified wavelength acquisition step for acquiring, for each of the plurality of frequencies, a wavelength of the elastic wave induced in the test object from the vibration state acquired in the frequency-specified vibration state acquisition step;

a frequency selection step for selecting an appropriate frequency from the plurality of frequencies, based on a kind and size of a defect expected to be present in the test object as well as the wavelength acquired for each of the plurality of frequencies; and a defect detection step for detecting a defect by using an image of the elastic wave formed on the surface of the test object by inducing the elastic wave having the frequency selected in the frequency selection step in the test object.

8. The defect detection method according to claim 7, wherein an image of the elastic wave created at the selected appropriate frequency along with a numerical value of the selected appropriate frequency are displayed on a display unit to analytically process the displayed image to detect the defect.

9. The defect detection method according to claim 7, wherein the frequency-specified vibration state acquisition step comprises:

inducing a plurality of elastic waves in the test object by using a plurality of frequency candidates respectively, wherein the plurality of frequency candidates are within a frequency range suitable for defect detection estimated based on a wavelength range defined based on the kind and size of the defect, wherein the frequency selection step comprises:

selecting a frequency which yields a largest value of an amplitude of one of the elastic waves under a condition that a wavelength of the one of the elastic waves is within the wavelength range from the plurality of frequency candidates.

* * * * *